US011937342B2

(12) United States Patent
Palmer et al.

(10) Patent No.: US 11,937,342 B2
(45) Date of Patent: Mar. 19, 2024

(54) SPOT HEATER

(71) Applicant: Battelle Memorial Institute, Columbus, OH (US)

(72) Inventors: Katherine M. Palmer, Galloway, OH (US); Kurt Bosworth, Woodstock, OH (US); Kevin Yugulis, Columbus, OH (US); Amy M. Heintz, Dublin, OH (US); Jeffrey L. Ellis, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 437 days.

(21) Appl. No.: 17/030,329

(22) Filed: Sep. 23, 2020

(65) Prior Publication Data

US 2021/0112627 A1 Apr. 15, 2021

Related U.S. Application Data

(60) Provisional application No. 62/904,622, filed on Sep. 23, 2019.

(51) Int. Cl.

| | |
|---|---|
| ***H05B 3/10*** | (2006.01) |
| ***H05B 3/00*** | (2006.01) |
| ***H05B 3/03*** | (2006.01) |
| ***H05B 3/16*** | (2006.01) |
| ***H05B 3/20*** | (2006.01) |
| ***H05B 3/22*** | (2006.01) |
| ***H05B 3/34*** | (2006.01) |

(52) U.S. Cl.

CPC ............ *H05B 3/0004* (2013.01); *H05B 3/03* (2013.01); *H05B 3/10* (2013.01); *H05B 3/34* (2013.01); *H05B 2203/007* (2013.01); *H05B 2203/013* (2013.01); *H05B 2203/016* (2013.01); *H05B 2203/037* (2013.01)

(58) Field of Classification Search

None

See application file for complete search history.

(56) References Cited

U.S. PATENT DOCUMENTS

| | | | | |
|---|---|---|---|---|
| 6,169,275 | B1 * | 1/2001 | Noda | H05B 3/286 219/548 |
| 7,132,625 | B2 | 11/2006 | Voeltzel | |
| 7,706,647 | B2 | 4/2010 | Sandhu et al. | |
| 9,198,232 | B2 | 11/2015 | Lashmore et al. | |

(Continued)

FOREIGN PATENT DOCUMENTS

| | | | | |
|---|---|---|---|---|
| FR | 3102908 | A1 * | 5/2021 | B60H 1/2226 |
| JP | S62154493 | A | 9/1987 | |

OTHER PUBLICATIONS

Chu et al., “Self-heating fiber reinforced polymer composite using meso/macropore carbon nanotube paper and its application in deicing”, Carbon 66 (2014), 154-163, Elsevier Ltd.

(Continued)

*Primary Examiner* — Joseph M. Pelham

(74) *Attorney, Agent, or Firm* — Susanne A. Wilson; Frank Rosenberg

(57) ABSTRACT

A device is described in which the shape of a resistive heater material is configured to provide rapid and strong heating of a small area. The resistive heating material is heated unevenly while efficiently using power.

20 Claims, 14 Drawing Sheets
(5 of 14 Drawing Sheet(s) Filed in Color)

(56) References Cited

U.S. PATENT DOCUMENTS

| | | | | |
|---|---|---|---|---|
| 9,775,196 | B2 | 9/2017 | Song et al. | |
| 10,264,627 | B2 | 4/2019 | Hartzler et al. | |
| 2013/0334204 | A1* | 12/2013 | Aizawa | H05B 3/02 156/62.2 |
| 2013/0334206 | A1* | 12/2013 | Kato | H01L 21/67115 219/541 |
| 2014/0339210 | A1* | 11/2014 | Kobayashi | H05B 1/023 219/162 |
| 2015/0110477 | A1* | 4/2015 | Ota | H05B 3/06 392/435 |
| 2017/0156178 | A1* | 6/2017 | Schaumann | H05B 3/26 |
| 2017/0164425 | A1* | 6/2017 | Ooyama | B21D 22/208 |
| 2017/0314094 | A1* | 11/2017 | Ooyama | C21D 1/673 |
| 2020/0107408 | A1 | 4/2020 | Torrico et al. | |
| 2020/0260532 | A1* | 8/2020 | Sajic | H05B 3/342 |

OTHER PUBLICATIONS

Tarfaoui et al., "Self-heating and deicing epoxy/glass fiber based carbon nanotubes buckypaper composite", Journal of Materials Science, (2019), vol. 54, Issue 2, pp. 1351-1362, Springer.

International Search Report and Written Opinion for International Application No. PCT/US2020/052334, dated Dec. 11, 2020.

Machine translation of description of Japanese Patent No. JPS62154493.

Written Opinion Of The International Preliminary Examining Authority from international application No. PCT/US2020/052334 dated Sep. 15, 2021.

* cited by examiner

BATTELLE

SPOT HEATER

RELATED APPLICATION

This application claims the priority benefit of U.S. Provisional Patent Application Ser. No. 62/904,622 filed 23 Sep. 2019.

INTRODUCTION

Faced with the problem of creating an opening in flexible plastic sheeting, we have developed a heating device capable of conforming to a curved surface and quickly applying intense heat to a small area. A variety of previously developed conformal heaters are reviewed below.

Torrico et al. in WO 2018/208935 entitled "Process of making conformable, low voltage, lightweight joule heating elements and heating elements," describes several ways of making conformable, resistive heating elements made from carbon nanotubes (CNTs). These elements are described as being lightweight and highly efficient. The layers of thin film CNT joule heating elements may be enveloped between two polymer films (e.g., high-temperature polyamides like Kapton™) to form an electrically insulated thin film heater. Aligned CNT thin film heaters were evaluated with 1.5 V and 3.0 V applied and were reported to consume less than 5 W of power to reach 150° C. in all cases. The data presented in the figures showed an increase in temperature of about 20 to 50° C. in about 10 seconds.

The scientific literature includes several reports of CNT paper resistive heaters. For example, Chu et al., Carbon 66 (2014), 154-163, "Self-heating fiber reinforced polymer composite using meso/macropore carbon nanotube paper and its application in deicing." Tarfaoui et al., Journal of Materials Science, (2019), Volume 54, Issue 2, pp 1351-1362, "Self-heating and deicing epoxy/glass fiber based carbon nanotubes buckypaper composite." Buckypaper was sandwiched between two glass fibers veils and then infiltrated with an epoxy polymer resin and cured. The composite can be heated up very quickly using an electrical power source. The idea of using this new material as a heater and de-icing material was explored experimentally. For that purpose, the temperature distribution was monitored at different positions of the panel using thermal imaging. Experimental results showed that the surface temperature of the panel increases gradually as the heating time increases.

Lashmore et al. in U.S. Pat. No. 9,198,232 describe processes of making and testing CNT resistive heaters. CNTs can be processed into a woven or nonwoven sheet, have conductive ends applied, and be impregnated with a polymeric resin. The resulting heaters are described as being flexible and suitable for integration into a variety of devices on flat or curved surfaces, and can be cut to any desired shape including square, round, triangular, rectangular, hexangular, or irregularly-shaped. Rectangular heater strips and strips with a parabolic profile were tested and found to have a highly uniform temperature distribution.

SUMMARY OF THE INVENTION

The invention involves the use of a shaped resistive heating element. The resistive element contains one or more restrictions to electrical flow. In application, the invention typically includes: a power source; a resistive element; and electrical connections between the power source and the resistive element. There may be a plurality of any or all of these components. In use, the resistive element is typically attached to a substrate to be heated.

The power source is typically a battery although other power sources may also be utilized. The electrical connections can be wires or other electrical conduits that are placed on opposite ends of the resistive element. Since the wires are a heat sink that has a large mass relative to the heating element, they form a heat sink. Therefore, the constriction(s) should not be too near the leads and for many uses is preferably at least 0.5 cm or at least 1 cm from each lead, in some embodiments, in the range of 0.5 to 10 cm from each lead to the center of a constriction.

The device is designed to work with direct current; however, it is believed that it will also work with alternating current. The device also works if the anode and cathode are switched.

In one aspect, the invention provides a method of resistive heating, comprising: providing a sheet of a resistive heating material that comprises an area or areas of reduced cross-sectional area which are adapted to constrict current flow through the sheet of heating material; passing an electric current through the sheet such that the area or areas increase in temperature to a temperature that is at least 5 K greater than the average temperature of the sheet. In direct current (or half a cycle of alternating current), there is a direction of net current flow through the sheet and the area of reduced cross-sectional area refers to an area on the major surface of the sheet. A sheet is essentially two dimensional; in a related aspect, the invention includes a three dimensional spot heater structure comprising: a resistive heating material that comprises a cross-sectional area or areas of reduced cross-sectional area which are adapted to constrict current flow through the resistive heating material; and an actuator for providing electrical current through the resistive heating material.

In another aspect, the invention provides a spot heater, comprising: a sheet of a resistive heating material that comprises an area or areas of reduced cross-sectional area which are adapted to constrict current flow through the sheet of heating material; and an actuator for providing electrical current through the sheet. In a related aspect, the invention provides a spot heater, comprising: a resistive heating material that comprises a cross-sectional area or areas of reduced cross-sectional area which are adapted to constrict current flow through the resistive heating material; and an actuator for providing electrical current through the resistive heating material.

Any aspect of the invention may include one or any combination of the features: the sheet has the geometry of the type described in this application; the method employs any of the spot heater configurations described here; current is generated by electromagnetic inductance; at least one connection to an anode and at least one connection to a cathode; resistive sheet is a triangle with an anode connected at one edge of the triangle through a busbar and a cathode connected to an opposite point of the triangle; a "bow-tie" configuration with the resistive sheet having two sides where each side is larger (in volume and preferably in area) toward the outer edges (in the direction of current flow) and smaller in between wherein the hottest spot occurs where the smaller regions meet; a notch configuration wherein a notch is made in the resistive heating material to create the hot spot; where the constricted regions have cross-sectional areas that are at least 40%, 50%, 70%, 80%, or at least 90% (or 50 to 97%) smaller than at least one area toward the outer edges of the sheet in the direction of current flow (or reverse current flow); temperature in a hot spot is at least 10, 20, 50, 100, 200, or at least 300 K hotter than other areas of the sheet of heating material; where the hottest contiguous 10% of the sheet is at least 10, 20, 50, 100, 200, or at least 300 K hotter than the 50% of the sheet where the resistive sheet is coldest (as measured at the sheet surface); wherein the sheet of heating material has a plurality of cut-outs or openings and the hot spots occur at constrictions between cut-outs or openings in material (the cut-outs or openings may be voids or may be filled with an insulating material); wherein the contiguous material comprises at least 2, at least 5, at least 10, at least 50, or 2 to 1000 hot spots created by areas (spots) of constrained current flow (during operation); wherein the sheet has a surface area of at least 10, 20, 50, 100 $cm^2$ and optionally were each hot spot is at least 0.1, 0.2, 0.5, 1 or between 0.1, 0.2, 0.5, 1 to 1, 2, or 5 $cm^2$; wherein a single sheet of material comprises at least 10, 20, 50, 100 or 10 to 10,000 cut-outs or openings and 10, 20, 50, 100 or 10 to 10,000 hot spots; or any combination of these features.

A "bow-tie" configuration is a configuration in which a hot spot is created in the interior (away from electrodes) of a sheet of resistive heater material in which there is a reduced area for current flow through the sheet; preferably there is at least a 50, 60, 70, or 90% reduction in cross-sectional area as compared with outer parts of the sheeting that are closer to electrodes. Surprisingly, the bow-tie configuration was found to be many times more efficient hot spot than a triangular configuration. The configuration also provides for the provision of busbar connections (rather than a point connection) at opposing sides of a resistive sheet.

The electrical connections can be attached to the resistive element relatively far from any constriction. The electrical connections can be attached to the resistive element by conductive adhesive or other appropriate methods depending on the compositions of the connections and heating element. A significant advantage of the invention is that the spot heaters can be fabricated with connections at a relatively large scale; we do not have to fabricate at the microscale to achieve microscale-sized heaters. To apply leads to a tiny dot of resistive material, it is challenging to achieve the necessary resistance using standard materials that are thermally stable. The inventive designs enable standard methods to fabricate interfaces between bus bars or wires and the resistive heaters. Moving the heat away from the bus bar/heater interface provides three significant advantages: it moves a heat sink further away from a hot spot; it allows the use materials of construction at this interface, such as adhesives, that need not meet the maximum service temperature of the spot heater; in addition, it eliminates the largest coefficient of thermal expansion (CTE) mismatch changes at this interface, increasing fatigue life. In preferred embodiments, the inventive designs provide a distance of at least 1 cm or at least 2 cm or at least 3 cm (in some embodiments up to 10 cm) from the center of the hot spot to the interface of the resistive heating material and an electrical connection; in operation, the hot spot is at least 100 F or at least 300 F hotter than the interface of the resistive heating material and an electrical connection.

The inventive spot heater has numerous applications. For example, the spot heater can be used in a seat heater or a heater than can melt a hole in a plastic film (for example, in a device in which a plastic film separates reactive components so that the activation of the heater initiates a chemical reaction. Many sensors require elevated temperature to operate. These often employ micro hot plates that can be provided by the inventive heaters. Examples include gas sensors, pressure sensors, humidity sensors. Lab on a chip or other diagnostics also require embedded heaters such as the inventive type. The heaters can be used in a vaping device. The heaters can be used in medical devices to warm a drug for injection and reduce warm-up time after removal from refrigerator. Other applications include (but are not limited to): non-hazardous non-explosive thermal decoy flares; destructive heater for computer boards for anti-tampering; localized on-demand thermal curing of adhesives for small constricted areas; spot welding, fuses, and a pressure relief valve that can be powered by a battery. The invention includes any of these devices comprising a spot heater of the type described herein. For example, in one aspect, the invention is a heated seat comprising a heater of the type described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE INVENTION

Resistive Heating Materials

Figure 1:
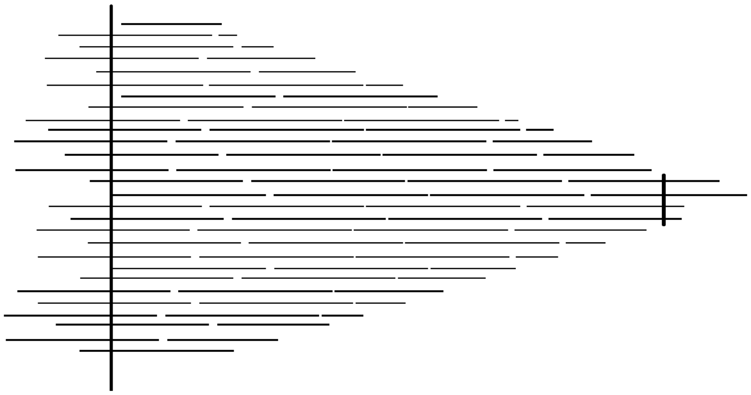
FIG. 1 illustrates a shaped resistive heater with aligned conductive fibers.

The preferred materials for the heater are those that can withstand high power densities in the range of 50,000 to 200,000 W/in$^2$ or 100,000 to 150,000 W/in$^2$, or about 120,000 W/in$^2$ and have low thermal mass to allow for rapid heat-up. Suitable materials include metallic foils and carbon-based materials such as graphite foils, carbon nanotube bucky papers, graphene sheets, and similar materials. However, to avoid excessive heat spreading, which would eliminate the effectiveness of the spot heat, it is preferred that conductive materials have thermal conductivity less than about 50 W/mK and/or sufficiently low mass (e.g. a thin film) and on a thermally insulating substrate. Inks and dispersions of these materials can also be used to print or spray-apply patterns of heaters onto substrates. For reusable heaters, any binding material in the ink must be selected to withstand the temperatures that will be generated or must be removed in a second processing step before use.

Because low thermal mass is a highly desirable property of the resistive heating material, carbon nanotubes are especially desirable materials for the present invention. The term "carbon nanotube" or "CNT" includes single, double and multiwall carbon nanotubes and, unless further specified, also includes bundles and other morphologies. The invention is not limited to specific types of CNTs. The CNTs can be any combination of these materials, for example, a CNT composition may include a mixture of single and multiwall CNTs, or it may consist essentially of DWNT and/or MWNT, or it may consist essentially of SWNT, etc. CNTs have an aspect ratio (length to diameter) of at least 50, preferably at least 100, and typically more than 1000.

The sheets of resistive heating elements can be sheets of commercially-available bucky-paper. The sheets can be stamped or cut to provide the features desired. (2) Alternatively, the heaters can be constructed using processes similar to those in printed circuit board (PCB) processes. The precursor ink is applied to a thermally stable substrate into the desired geometry. The system is cured, washed, and/or baked to eliminate thermally labile components.

Other materials of construction, such as to create laminates, can be used. For any substrate that is in contact with the heater, the material should be selected for the service temperature that will be achieved and any dielectric resistance needed to isolate the heater electrically from other conductive components. For high temperature applications, where the heater operates at 500 to 700° F., suitable plastic materials include polyimides (Kapton HN, Meldin® 7001), polyamide imide (Torlon), polybenzimidazoles, and polytetrafluoroethylene.

The heaters can also be applied to glass, ceramics, and other hybrid organic-inorganic systems. Bonding for composites and other laminates can, likewise, utilize adhesives that are appropriate for the target temperatures. Arrays of these designs can be used in applications where fast heat up time is desired such as ovens for food preparation, clothes dryers, dishwashers or on components for evaporative heaters for refrigerators.

For resistive heaters formed with conductive fibers, it is preferred that the fibers are non-aligned. If the fibers are aligned, and the film is then cut into the shapes of this invention, there will be pathways that are terminated (see FIG. 1). Because in an aligned film, there is minimal interaction between adjacent pathways, focusing geometries do not provide current density amplification. In a randomly oriented sample, the number of connections between adjacent films is maximized. In practice aligned samples do not normally have such perfect alignment. Nonetheless, it is desirable to maximize the connection between parallel pathways, whether through random alignment or other methods.

Since the preferred resistive elements are carbon nanotube (CNT) sheets or other shapes; the following discussion incorporates known descriptions of CNT resistive heater features that can be incorporated into preferred embodiments of the invention.

A CNT network can be prepared, for example, as a dispersion of CNTs applied directly to a substrate where the solvents used in the dispersion process are evaporated off leaving a layer of CNTs that coagulate together into a continuous network. The CNT network may be prepared from dispersions and applied by coating methods known in the art, such as, but not limited to, spraying (air assisted airless, airless or air), roll-coating, gravure printing, flexography, brush applied and spin-coating. The thickness of the CNT layer is preferably in the range from 0.005 μm to 100 μm, or in the range of 0.05 μm to 100 μm, or in the range of 0.3 μm to 100 μm.

The CNT layer may include other optional additives such as p-dopants. P-dopants could include, but are not limited to, perfluorosulfonic acids, thionyl chloride, organic pi-acids, nitrobenzene, organometallic Lewis acids, organic Lewis acids, or Bronsted acids. Materials that function as both dispersing agents and dopants such as Nafion and hyaluronic acid may be present. These materials contain p-doping moieties, i.e. electron accepting groups, within their structure, often as pendant groups on a backbone. Generally, these additives will be present as less than 70% by weight of the CNT film, and in some embodiments as less than 50% by weight of the CNT film. CNT network layers of the present invention preferably contain at least 25 weight % CNT, in some embodiments at least 50 wt %, and in some embodiments 25 to 100 wt % CNT. The volume fraction in the network layer is preferably at least 2% CNTs, more preferably at least 5%, and in some embodiments 2 to about 90%. The remainder of the composite may comprise air (by volume) and/or other materials such as residual surfactant, carbonaceous materials, or dispersing agent (by weight and/or volume). Polymers and carbohydrates that function as both dispersing agents and dopants can be distinguished from other polymer materials, i.e. those functioning as only a dispersing agent or those functioning as a structural component. Because of the presence of electron accepting moieties, these materials can form a charge transfer complex with semiconducting CNTs, which p-dopes the semiconducting CNTs and raises the electrical conductivity. Thus, these dual dispersing agent/dopants can be tolerated at a higher mass percentage within the CNT layer than other types of polymer materials or surfactants.

If present, the thickness of a coating composition over the CNT material is preferably 2 mm or less, more preferably 150 μm or less, preferably 50 μm or less, in some embodiments, a thickness of 250 nm to 50 μm; thicker layers can experience foaming or bubbling during application that leads to pathways for a subsequent topcoat to penetrate and disrupt the conductivity of the CNT layer. Since it is important to reduce heat loss, any adjacent layer should not form a substantial heat sink. In some embodiments, the spot heater is applied to a substrate into which the heat is to be directed, the other major surface of the heater can be a thermally insulating material or a thermally reflective material.

A coating composition can be applied to the CNT network by known methods; for example, bar coating or spraying.

Techniques, such as troweling, that disrupt the CNT network should be avoided. After application of a protective coating to the CNT network, the coated substrate can be cured (in some embodiments, curing is conducted at ambient temperature). In the curing operation, the film forming materials crosslink to leave a mechanically durable and chemically resistant film.

A multilayered laminate resistive heater could be manufactured with conventional roll coat equipment. The electronic leads could be printed on a base substrate, such as 3M's Aerospace quality protective film. The carbon nanotube dispersion can then be applied to the film printed with circuitry with conventional roll coating methods. The protective coating could also be applied in this manner in-line.

In some embodiments, the CNT is substantially polymer-free such that polymer (if present) does not significantly affect the electrical properties of the layer; in some embodiments, the interior of the CNT layer contains 10 weight % polymer or less, more preferably 5 wt % or less, and still more preferably 2 wt % or less. In some embodiments, a pressure sensitive adhesive (PSA) is present on the major side of the substrate opposite the side over which the CNT layer is disposed. The PSA can be used to adhere the resistive heater to a surface in need of heating. A resistive heater laminate can be applied in the field since the substrate can be backed with a pressure sensitive adhesive (an adhesive that bonds to a substrate by the application of pressure) and a release layer. The release layer would be removed and the laminated heater applied to a substrate like a sticker. A more permanent installation of a laminate heater can be applied with a structural adhesive such as epoxy instead of a pressure sensitive adhesive. If an adhesive is used to bond to a surface in need of heating, the adhesive is preferably thermally conductive.

The aqueous or non-aqueous solvent present in common top coats, when applied to a CNT material, may disrupt the electrical properties of the CNT material by several mechanisms. One mechanism is by increasing the electrical resistance between adjacent CNTs. Topcoats dissolved in solvents can infiltrate the CNTs, permitting the topcoat resin system to permeate and cure between the individual CNT fibers. The CNTs require intimate contact to transport electrical charge from one CNT to another; charge transport takes place though either tunneling or hopping. If a non-conductive polymer resin remains between the CNTs, it prevents close contact of CNTs, which increases the energy associated with electron hopping or tunneling, and behaves as a high resistance resistor in series. The effect is that the bulk conductivity of the CNT material is reduced significantly. Treatment of CNTs with surfactants or dispersing agents is often used to improve their interaction with water or solvents. After film formation; these surfactants and dispersing agents often remain in the film, continuing to modify the surface properties of the CNTs. This renders the CNT layer more susceptible to penetration by aqueous or non-aqueous solvents. To avoid this problem, in some preferred embodiments, a solvent-free protective layer can be used to prevent the change in resistance that accompanies the application of either organic-solvent-based or water-based coatings to CNT materials. In some embodiments, a polyurethane coating is in direct contact with the CNT layer.

The polymer protective coating provides sufficient chemical resistance so as to prevent solvents (including water), or other environmental hazards from subsequently applied coatings or solvents from penetrating the polymer and disrupting the CNT network or changing its conductivity significantly.

CNT layers have many contacts between CNTs and good conductivity that is, a resistivity less than 0.05 Ω·cm, preferably less than 0.002 Ω·cm. The sheet resistance of this layer should be less than 500 Ω/square, preferably less than 200 Ω/square, more preferably less than 50 Ω/square. A CNT layer may be planar, cylindrical, or other contiguous geometry; in some preferred embodiments, the CNT layer is substantially planar (similar to a sheet of paper or a non-woven textile sheet, a few fibers may project from a planar layer). These are preferred characteristics of the CNT layer both before and after an optional coating is applied over the CNT layer.

Application of a coating should result in less than 80% change in resistance, preferably less than 10% change in resistance, and still more preferably less than 5% change in resistance, after curing the coating. Likewise, application of subsequent layers on top of this stack preferably do not increase the resistance by more than 5%, preferably by 3% or less.

The resistive heating film may have an essentially constant film thickness and a varied shape (in two dimensions) to provide one or more constrictions. The thickness of the resistive element preferably varies by 25%, 10%, or 5% or less. In some embodiments, a resistive heating film has a maximum thickness of 5 mm or less, in some embodiments in the range of 0.001 to 3 mm, or 0.01 to 2 mm, or 1 mm or less, or at least 0.1 mm and/or at least 0.001 mm.

Alternatively, the constriction can be formed in three dimensions such as by a (truncated) cone or (truncated) pyramid or a sheet of truncated cones or pyramids, or a curved hourglass shape. These are the three dimensional equivalent of the bow tie configuration. Likewise, other versions of the two dimensional sheets can be reconfigured in the equivalent in three dimensions.

Variables

To evaluate concepts and trends discussed in this patent application, computational electrodynamics modeling was used. The code calculates electric current density from the electric potential between the two electrical leads. Since the geometries are complex and potentially 3-dimensional, the geometry is discretized into small elements, referred to as control volumes, in which the governing equations can be more readily solved.

The solver is an iterative solver, solving the governing equation for electric potential on the control volumes, balanced with the applied boundary conditions. The result is a electric potential field that an be used to calculate current density and ultimately power density. The code works by iteratively solving the governing equations on the cells, moving closer to a solution that satisfies the boundary condition, while maintaining stability and accuracy. The code typically converges onto the solution within 200 iterations. The solver computes the electric potential using the following equation, which is integrated on the faces and volume of the control volumes, respectively, depending on their integral format $$-\oint_A \sigma \nabla_\phi \cdot da - \oint_A \sigma \frac{\partial A}{\partial t} \cdot da = -\oint_A \sigma \rho_\epsilon \cdot da + \int_V s_\phi dV$$

Once calculated, the electric potential is calculated, the current density can be calculated according to the following relation, where J is the current density and E is the electric field vector J=GE Symbols:

$\varepsilon$-electrical permittivity $\sigma$-electrical conductivity $A$-magnetic potential vector $\phi$-electric potential $\oint_A da$-Integral over control volume face $\frac{\partial A}{\partial t}$-Time variation in magnetic field $\rho$-electric charge density $\int_V dV$-Integral over control volume $s_\phi$-Source term representing electric currents flow through the control surface face Several parametrics were run to determine the sensitivity of maximum power density on these variables. The maximum values were taken from an infinitesimally small location and therefore will not likely be as high as calculated.

Some factors that can be varied to control properties of the spot heater include: 1) the height ratio from the incoming lead to the constriction, 2) the angle that the constriction forms, and 3) height of the section after the constriction.

The distance to the start of the feature is preferably large enough to ensure that the heat created does not disrupt the bond of the electrode to the resistive element. Preferably at least 0.2 cm or at least 0.5 cm, or at least 0.8 cm from the attachment to the anode and/or cathode. Preferably, there is no heat sink such as a high thermal conductor (especially one that has a mass of 50% or greater of the mass of the resistive heater material (typically a CNT sheet)) thermally connected to the heater and within 0.2 cm or at least 0.5 cm, or at least 0.8 cm from the nearest edge of a gap where the hot spot is formed.

Figure 2:
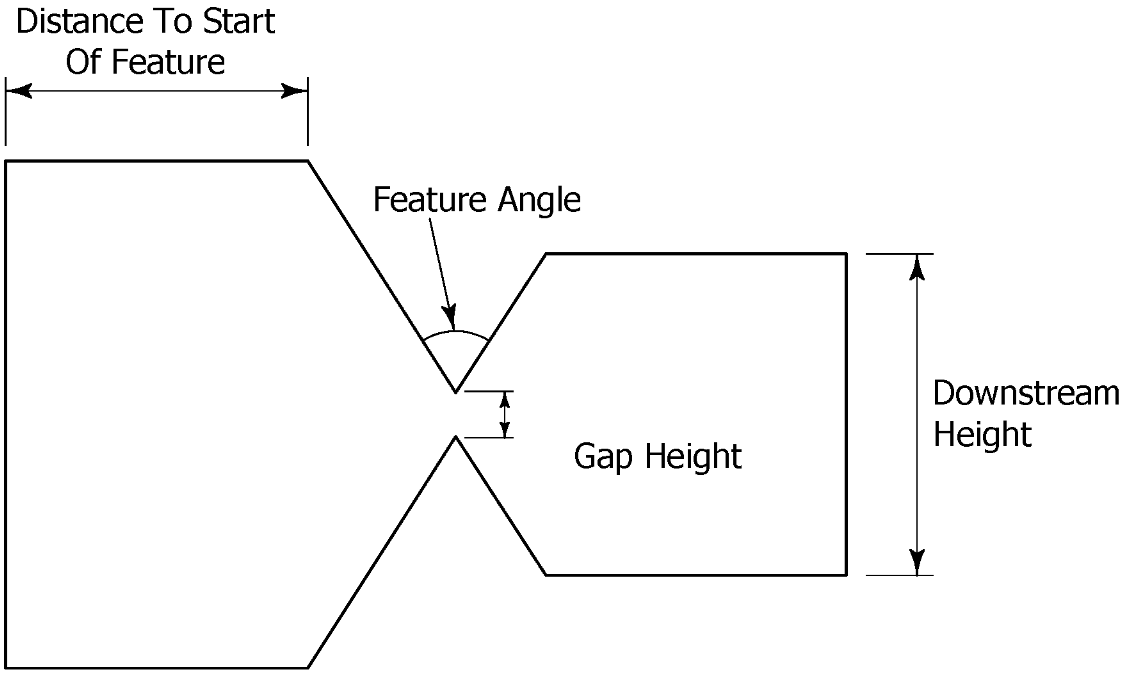
FIG. 2 shows some parameter definitions for a resistive heater.
Figure 3:
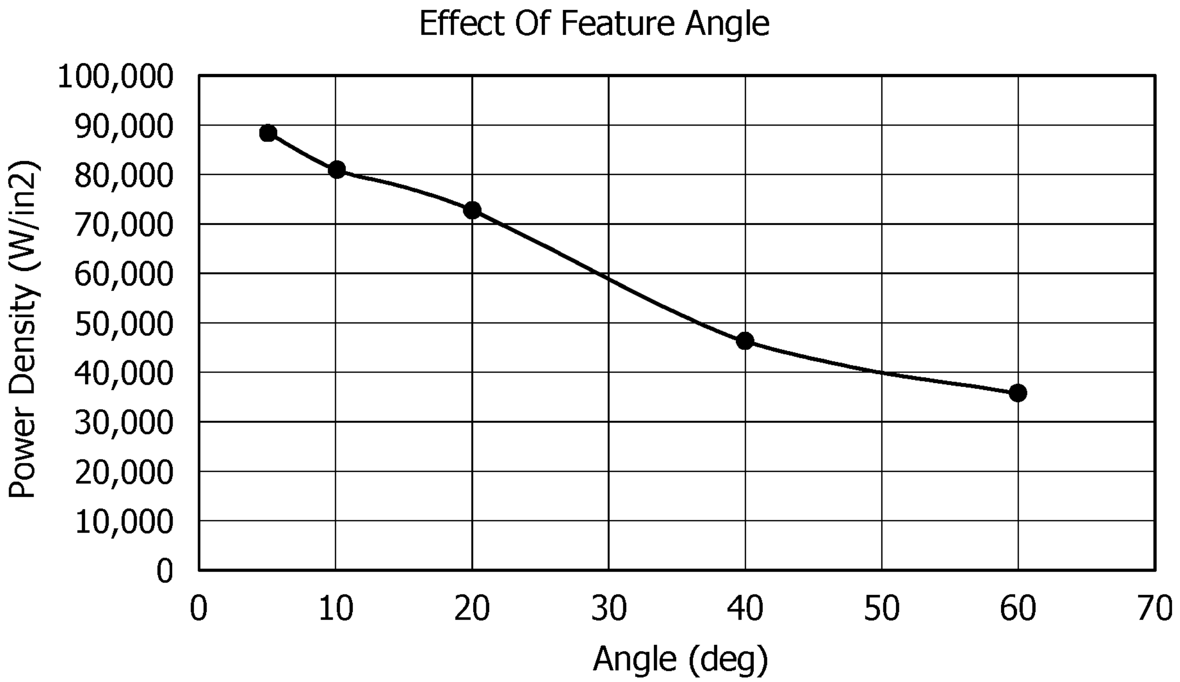
FIG. 3 shows that increasing the gap angle increases the power density in an approximately linear fashion.
Figure 3:
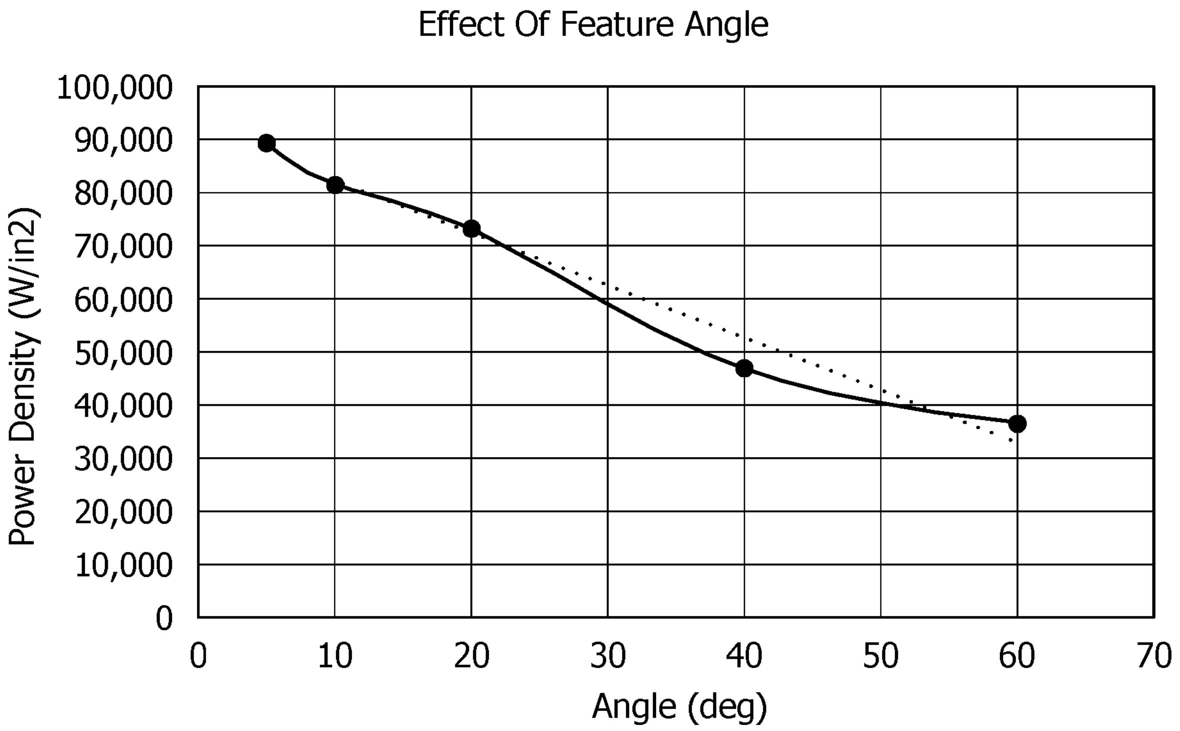
Figure 4:
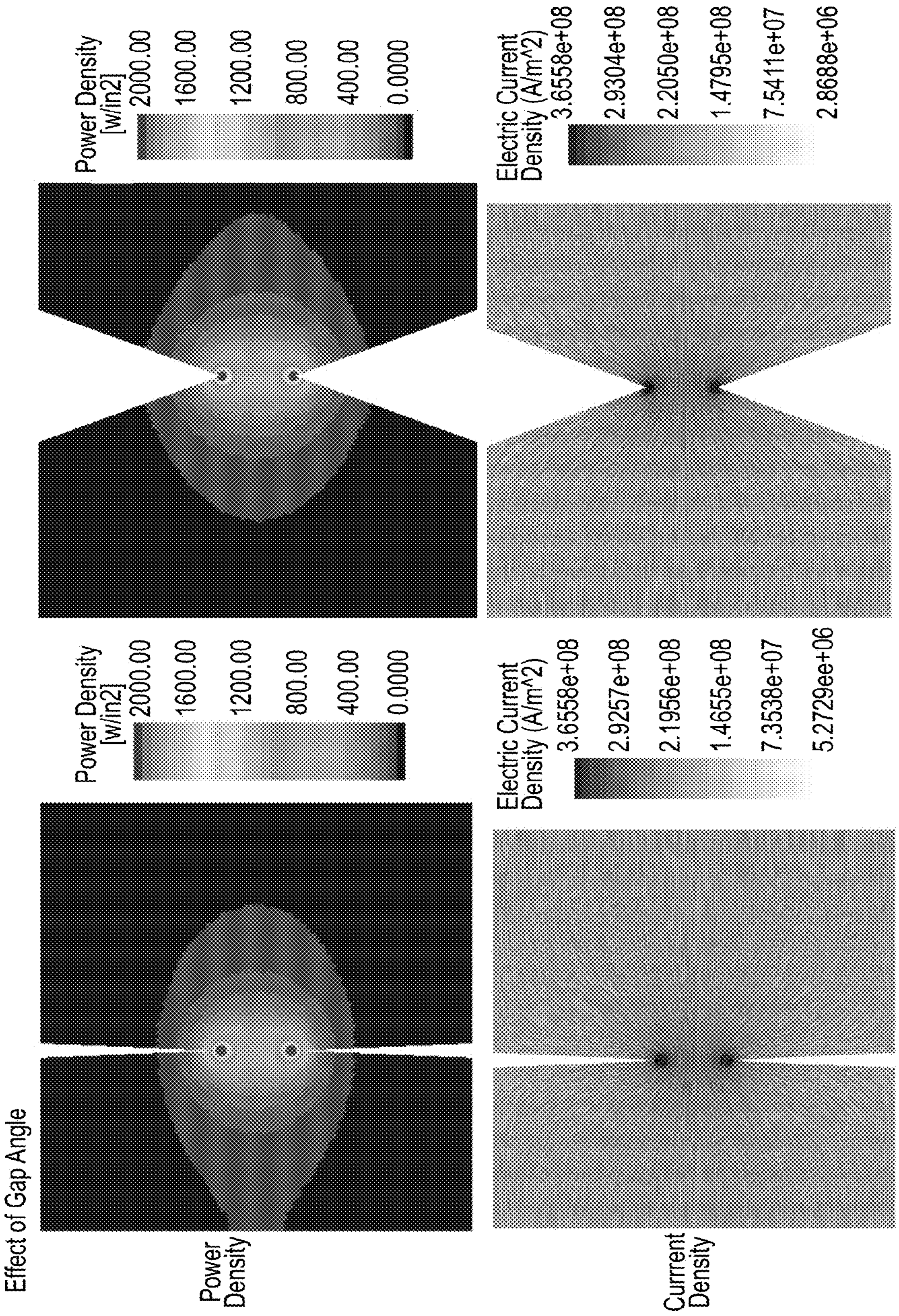
FIG. 4 illustrates the effect of two different gap angles on power density and current density.

FIG. 2 shows some parameter definitions. FIG. 3 shows that increasing the gap angle increases the power density in an approximately linear fashion. FIG. 4 compares the effect of two different gap angles on power density and current density.

Figure 5:
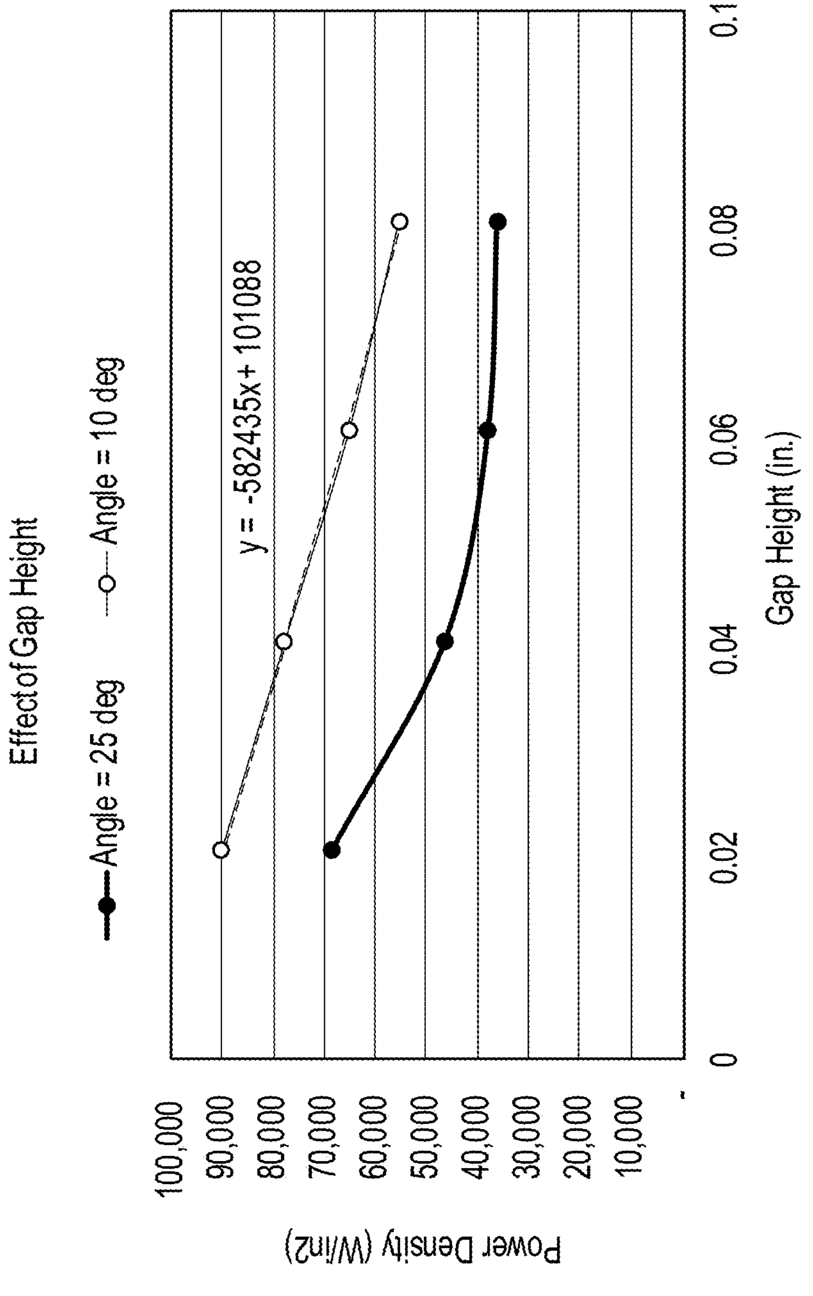
FIG. 5 shows power density as a function of gap height (in inches) for gap angles of 10° (top) and 25° (bottom).

Gap height affects the power density achieved in a significant way; the smaller the gap height, the higher the power density. This is shown in FIG. 5 for gap angles of 10 and 25 degrees.

The size of the leads also makes a difference.

The focusing factor effectively relates to the volume cross section at the constriction vs the volume for electrons to flow at the lead. This is because you have the same amount of electrons flowing at both points, so continuity requires there to be a higher current (or flux of electrons) at the smaller point, thus higher power density. Therefore, the focusing factor should be $$\frac{A_{Lead}}{A_{Constriction}}.$$

That is a generic sense, for a resistive heater with constant thickness, this can be written as effectively $$\frac{H_{Lead}}{H_{Constriction}}$$

where H is the height or length of the lead/constriction.

In some embodiments of the invention, the resistive heating sheet or spot heater can be characterized by any of the configurations or values shown in the figures. These characterizations include ±30%, or ±20%, or ±10% of any of these configurations or values including, but not limited to, power density, relative area, height, width, angle, and/or relative length ratios (for example, a constriction width to non-constricted width of at least one side) as shown in the figures.

Figure 6:
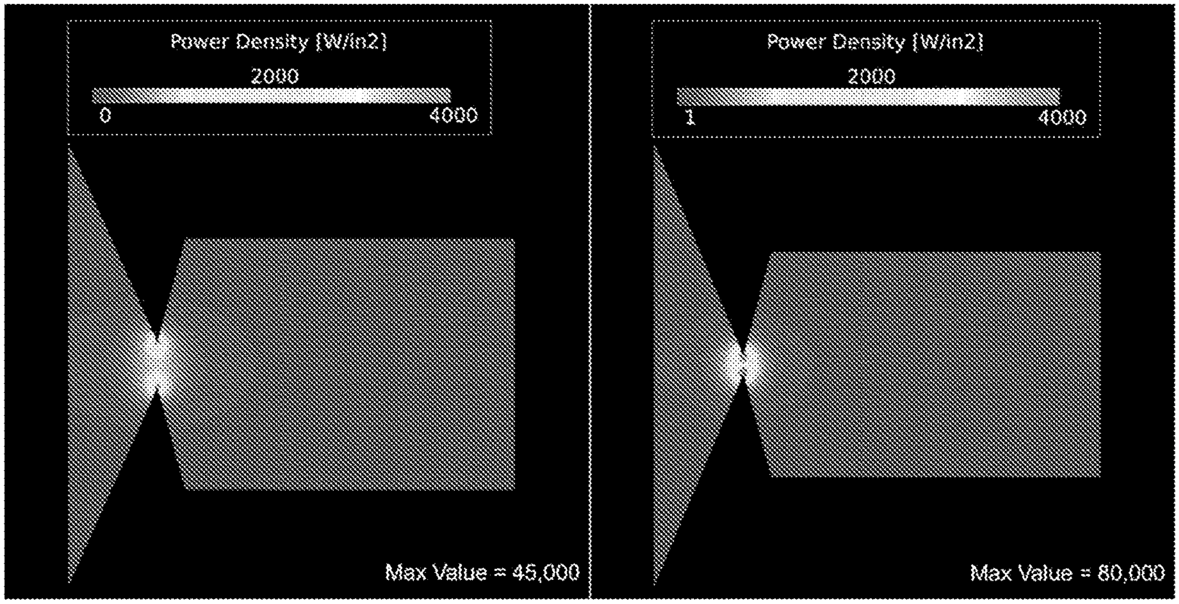
FIG. 6 illustrates how the extent of constriction controls the power density of a hot spot.

The constriction (percentage reduction in cross-sectional area perpendicular to net current flow) is the most important parameter as demonstrated by the images in FIG. 6. In this image, the only dimension changed in the minimum thickness. The scale is limited to 4000 W/in$^2$, however this clips the maximum value. Therefore, the max value is listed in the text box associated with each image. The reason the constriction is so significant is because it funnels all electrons in the circuit to a central location, increasing the current density locally. This is especially pronounced at the edges of the constriction.

Figure 7:
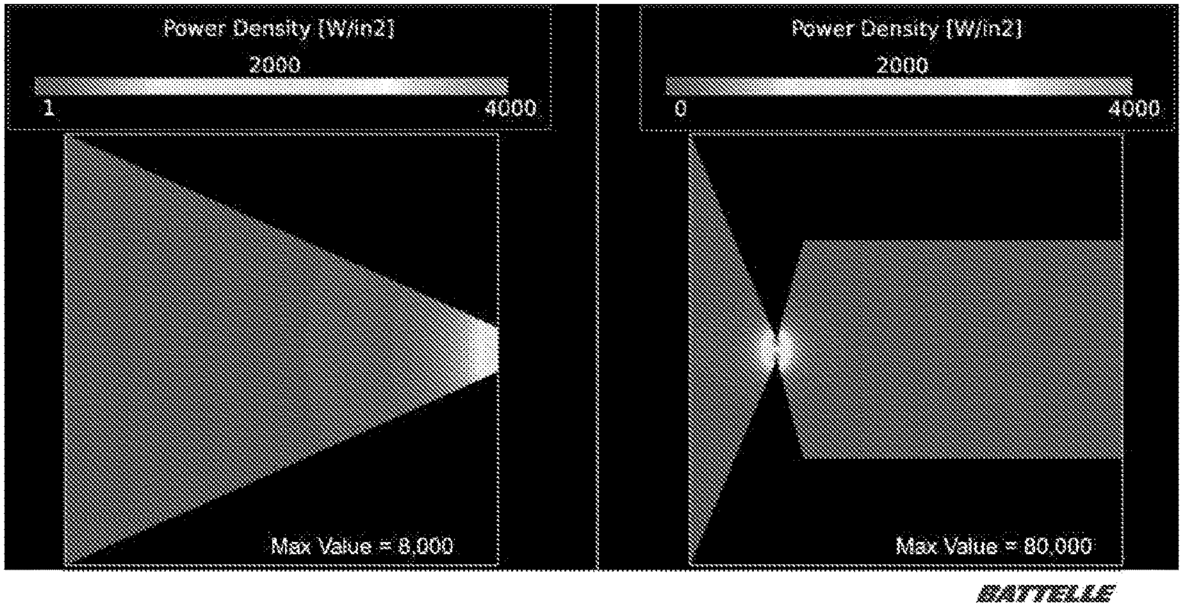
FIG. 7 shows the use of a notch to constrict flow and create a hot spot that is distanced from the heat sink created by the electrode.

In another preferred orientation, a notch is located in the center of the heater instead of at one end, and keep the heat away from the leads which act as a heat sink. See FIG. 7. A notch is preferably created by an angle of at least 70 degrees, or at least 80 degrees, on both sides of the gap; and preferably where the gap is located at least 0.4 cm from any electrode connected to the resistive heater.

Figure 8:
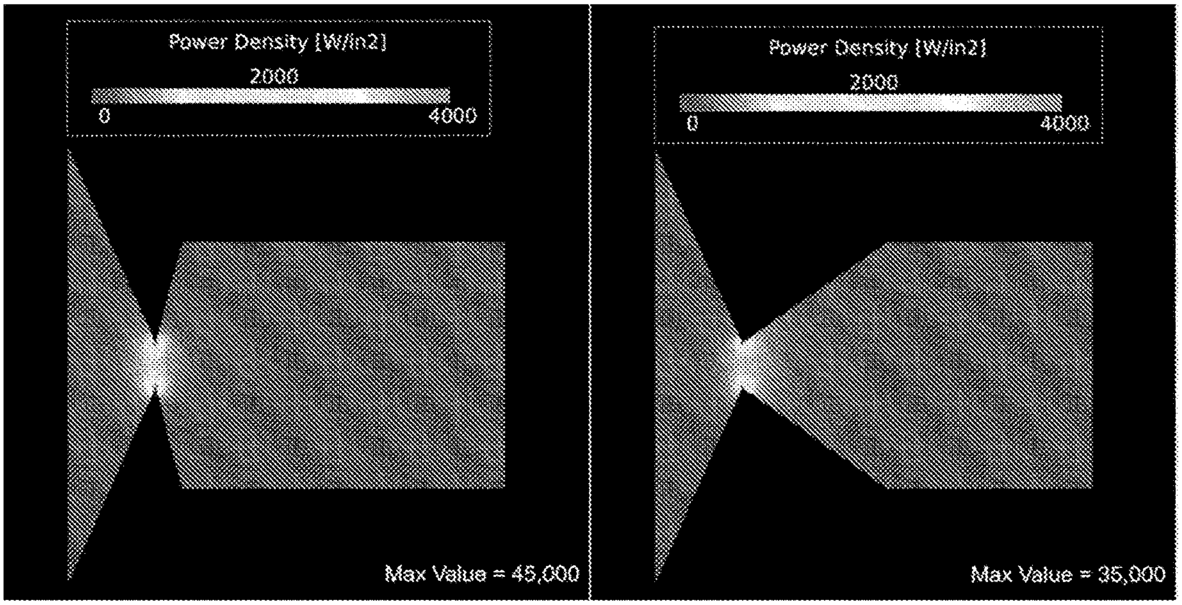
FIG. 8 illustrates the effect of constriction angle.

The angle at which the constriction is made also plays an important role, as is shown in FIG. 8. The angle on the right side of the constriction is varied from 75° (left) to 35° (right) while all other dimensions are maintained. It is observed that the peak value decreased by approximately 20%. Constriction angle is the angle of inclination of the resistive material as the material increases in height (or cross-sectional area) in direction of net current flow away from the gap. For direct current, there is an incoming constriction angle and an outgoing constriction angle. Constriction angle (either or both of incoming and outgoing) is preferably at least 35°, or at least 45°, or at least 60°.

Figure 9:
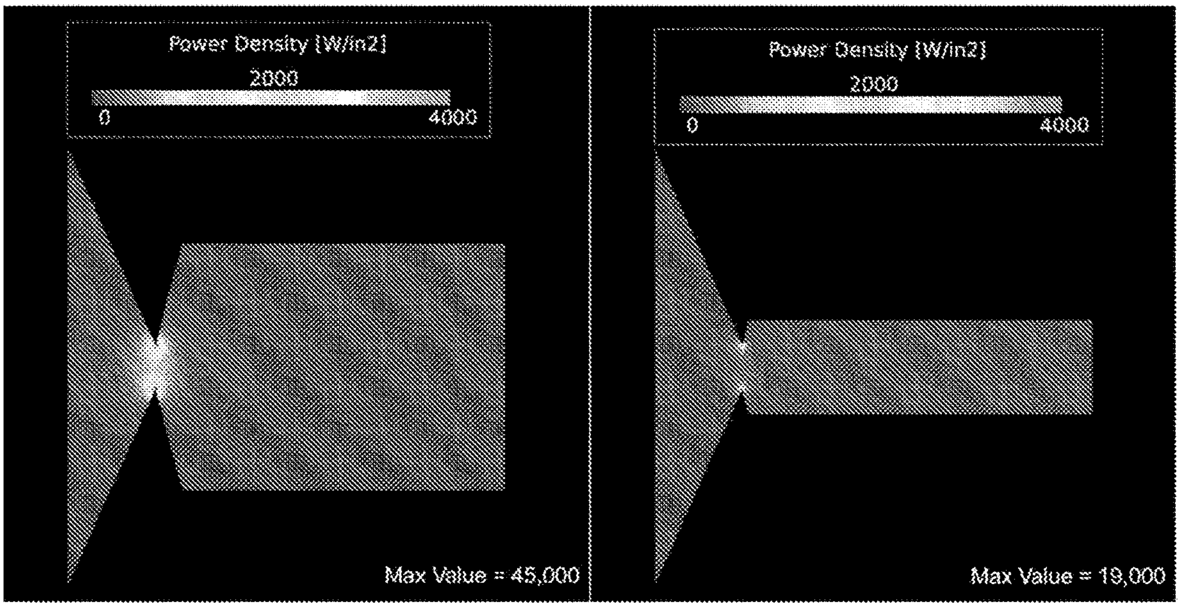
FIG. 9 illustrates the effect of material height downstream of the hot spot.

Downstream of the constriction, the amount to which the heater expands is an important parameter. FIG. 9 compares two heater designs that have identical geometry except the downstream expansion. In this scenario a 50% decrease in peak power density is observed. Thus, a downstream height of at least 50% or at least 75% that of the upstream resistive material is desirable.

Figure 10:
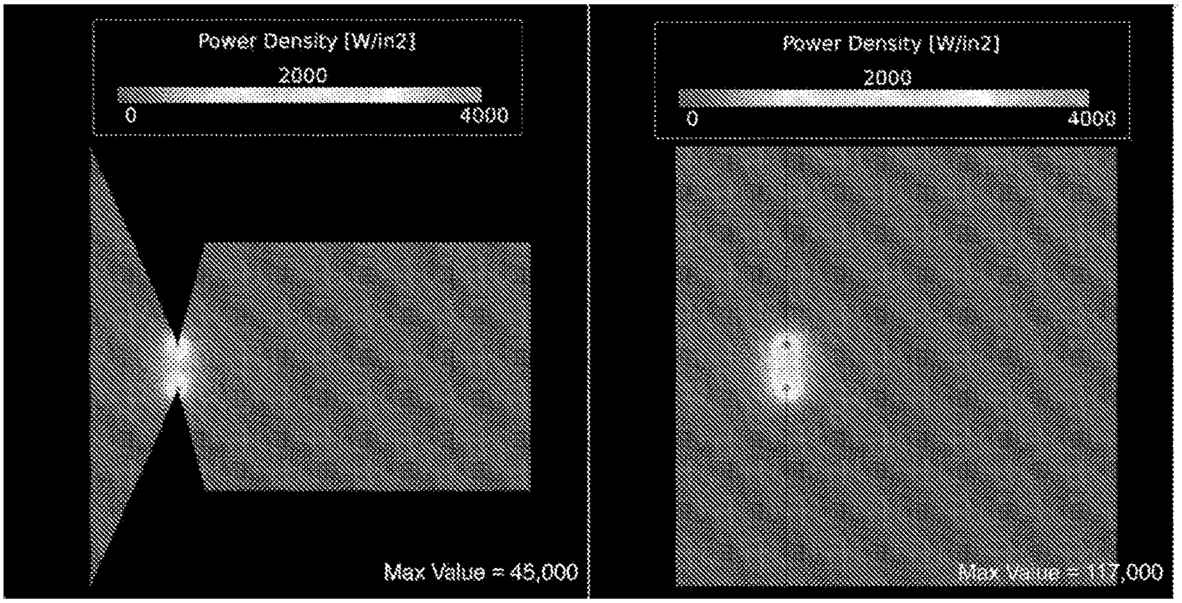
FIG. 10 shows the effect of gap length in a notched spot heater.

Extending these concepts to the extreme, if a vertical slit is created that is very fine, the maximum power density at these edges can be increased further. FIG. 10 shows this concept compared to the previous one with a 2.6× increase in peak power density, locally. There may be considerations, such as electrical or thermal shorts, that limit how thin a gap can be if the constriction angle approaches 90 degrees.

Figure 11:
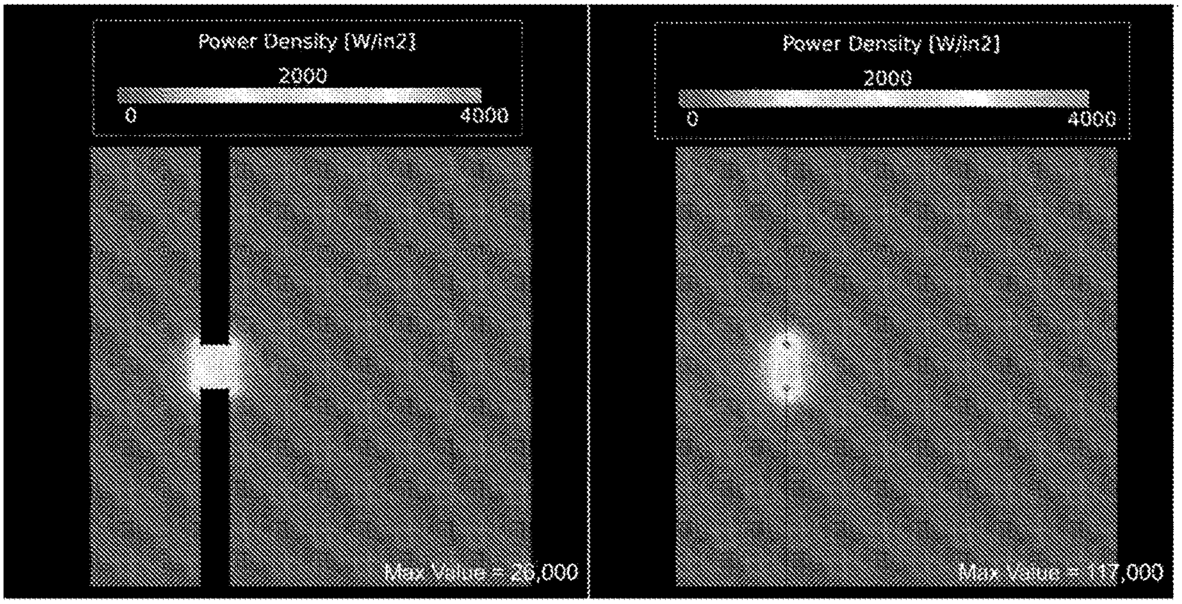
FIG. 11 shows how a wider gap length will decrease the peak current density values substantially.

In a variation, the width of the vertical slit is observed to be very critical. FIG. 11 shows how a wider gap length will decrease the peak values substantially.

Figure 12:
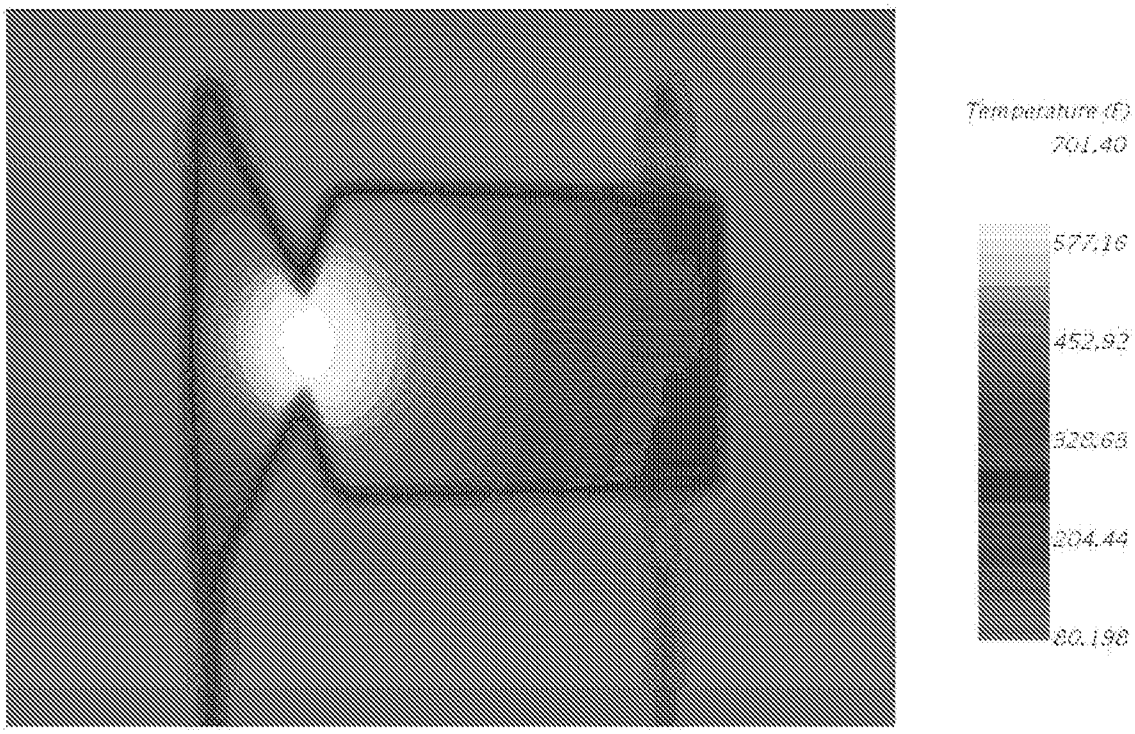
FIG. 12 illustrates a calculated heat profile of a spot heater in which the CNT sheet is surrounded by a layer of Kapton tape on either side.

A thermal model has been developed to assess how rapidly one of the optimized heaters would be expected to heat up. For this model, it was assumed that the heater was surrounded by a layer of Kapton tape on either side. This is depicted in FIG. 12. When run at 4.5V, the heater is observed to achieve a temperature of approximately 1200° F. in one second. When run at 9.0V, the heater is observed to achieve a temperature of 2000° F. in only 0.25 seconds.

In some embodiments, the spot heater heats to more moderate temperatures, for example, 250 F to 350° F., allowing the use of resistive heating materials that are more thermally labile, such as metal or carbon-filled polymers. Such systems can be injection molded or 3D-printed into three-dimensional geometries.

Other Designs

Figure 13:
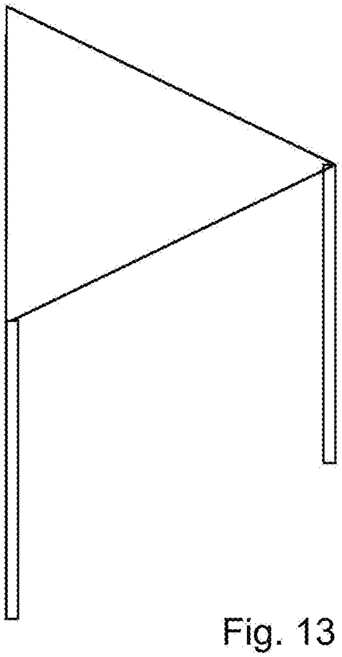
FIG. 13 illustrates an embodiment in which the resistive material is shaped to replace a busbar with the resistive heater material.

Another possible design is schematically illustrated in FIG. 13. The resistive heating element can be cut so that no busbars are required and heater connects directly to the power source via strips.

This can be laser cut from a single material and avoid the copper wire or other electrical connection. In the figure above, the connections to the resistor may not be shown to scale and may be wider to provide less temperature rise in the strips. The strip carrying electricity to the triangle may also be shaped to provide a plurality of connections to the side of the triangle furthest from the constriction in order to more evenly distribute current flow as current enters or exits the triangle.

EXAMPLES

Several polyimide tape heater geometries can achieve up to ±1600° F. (870° C.) with a voltage between 6 and 9 in <1 second. The heating is so rapid that it can create a small combustion of the tape. This is useful for single-use applications or multiuse with lower voltage and compatible materials. Additionally, 800° F. (426° C.) can be achieved with the polyimide heaters in approximately 30 seconds with very low power (1.5*v*). These characteristics can be used to define some preferred embodiments of the invention.

Figure 14:
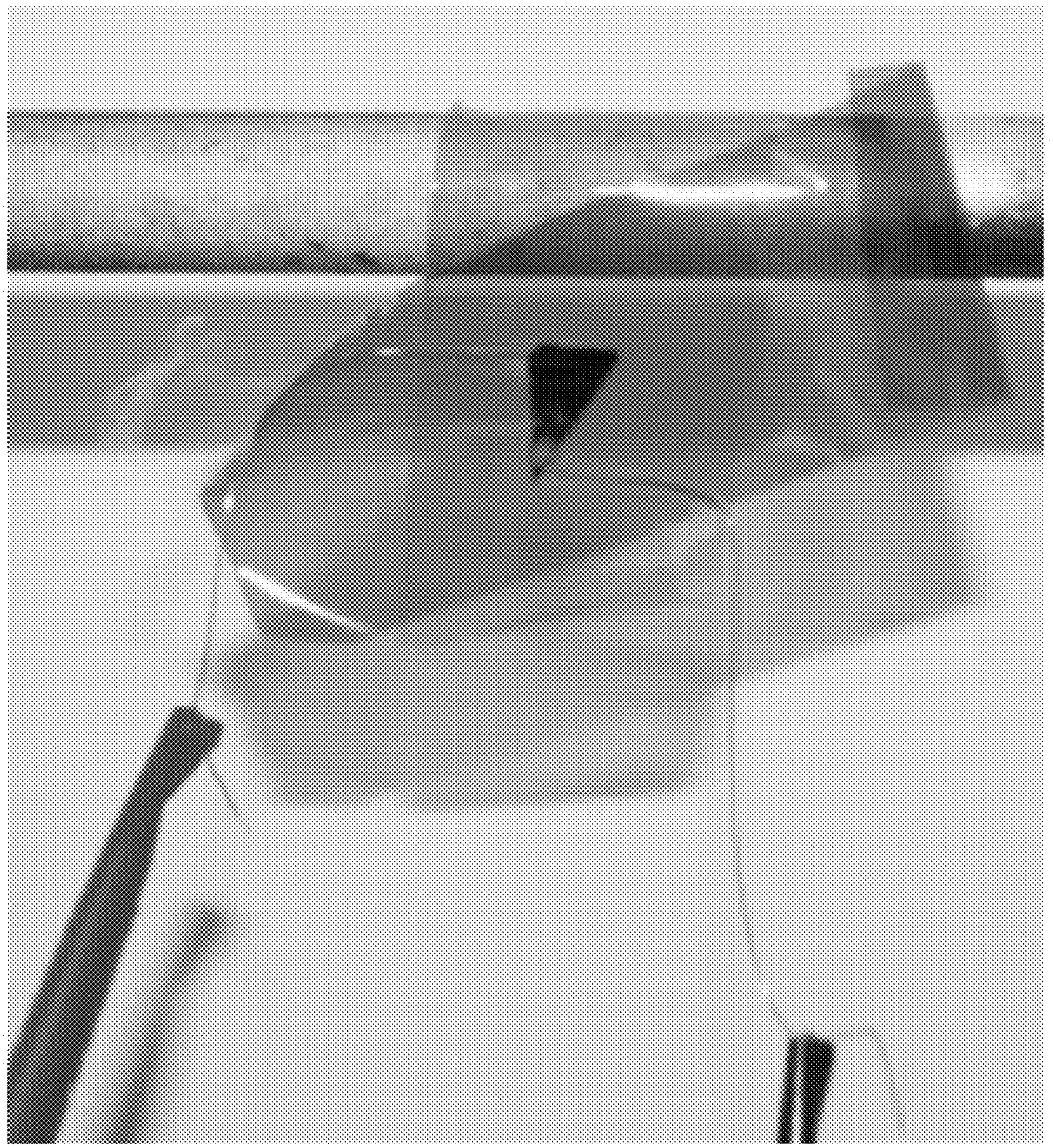
FIG. 14 is a photograph of a triangular spot heater in use.
Figure 15:
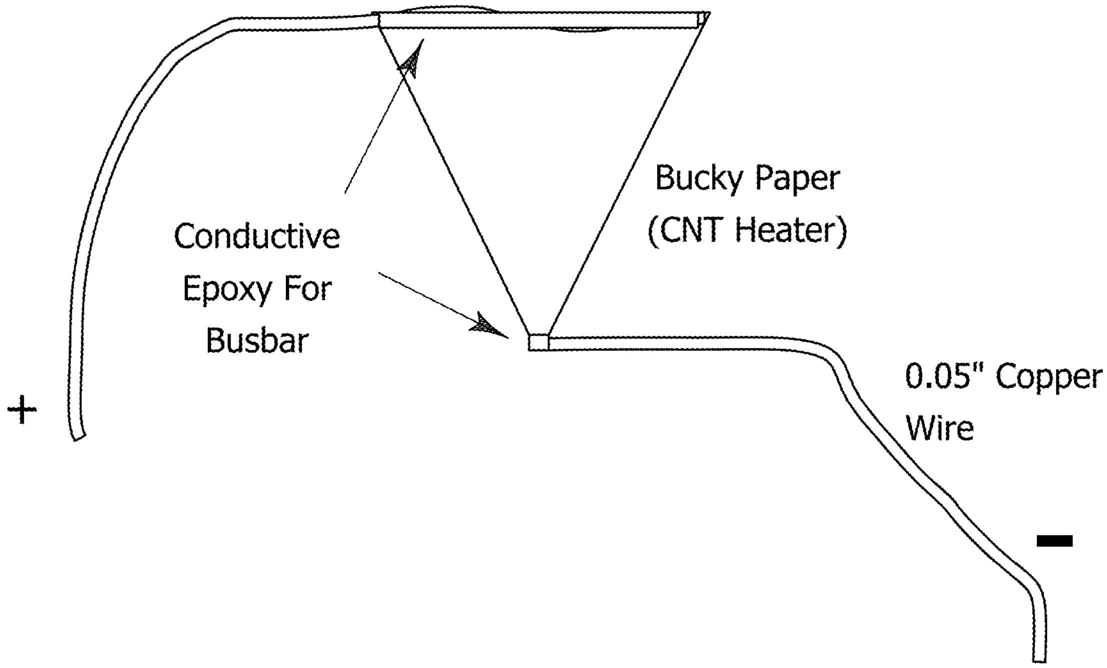
FIG. 15 is a diagram of the construction of the triangular spot heater. A bucky paper triangular heater was made to melt a polyethylene (HDPE) film in less than 0.5 seconds using 4.5-9 volts DC. The hot spot created near the negative busbar was >500° F.

As shown in FIG. 14, a triangular piece of buckypaper was connected to two electrical leads and current from a 9V battery was passed through the device. As can be seen in the photo, a red hot spot was generated near the apex of the triangle in less than 0.5 seconds. The illustrated device was sandwiched between two sheets of Kapton tape; however, these are not required for the invention.

Figure 16:
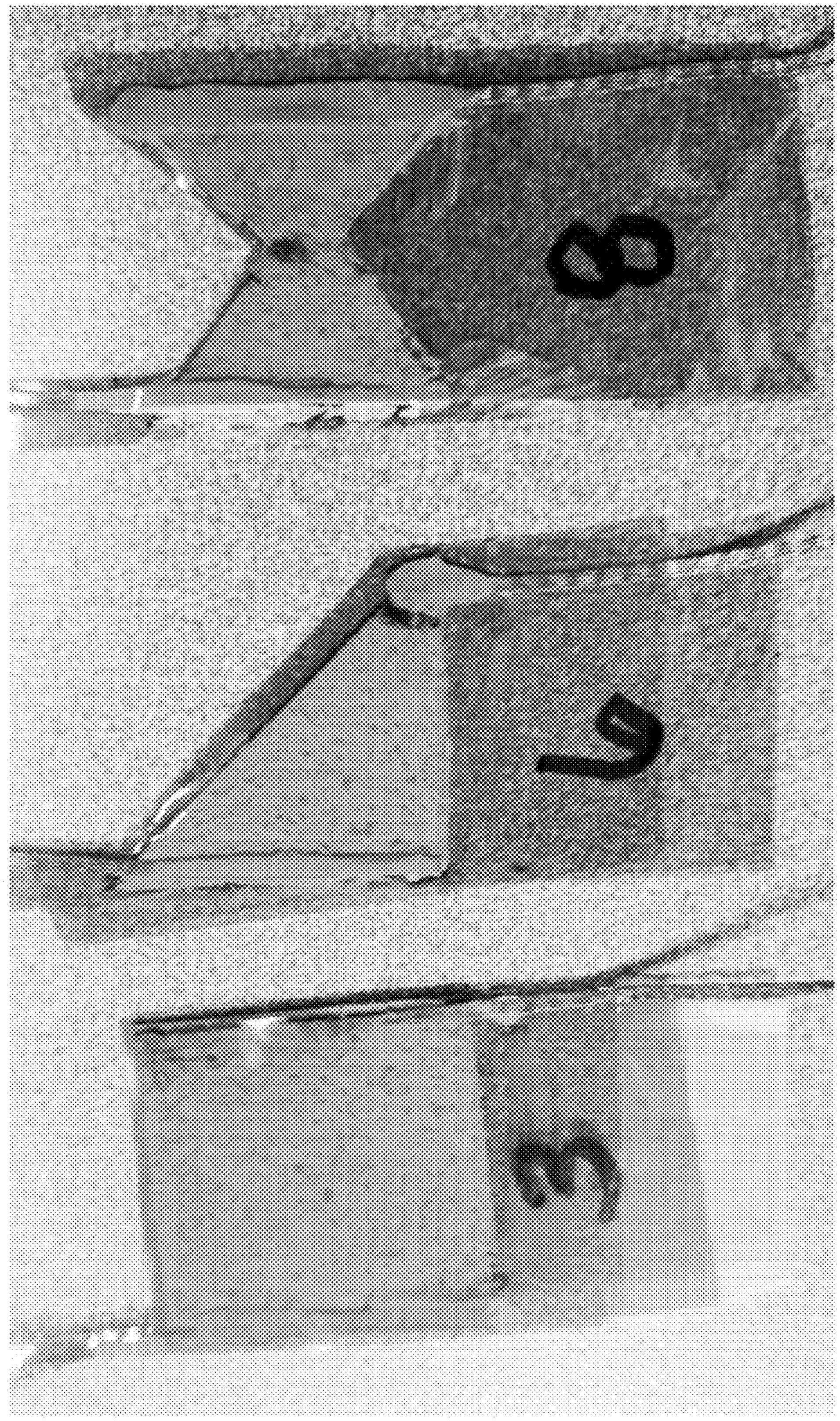
FIG. 16 shows 3 spot heaters that were tested as explained in the examples.

As shown in FIG. 16, three geometries were cut from 1"×1" squares of bucky paper-square, triangle, bowtie.

Materials: MWNT bucky paper, 60 gsm from Buckeye Composites approx 0.5 ohms/square surface, copper braid hex wik WC54 for leads, EJ2189 silver epoxy to attach leads to heaters, Tempilaq 700° F. temperature indicating paint over entire heater surface, Kapton tape Procedure: Voltage was applied to leads and recorded time required to visually observe Tempilaq paint turn from pale orange to black at any location on the heater.

The results of the heating tests showed that the triangle and bowtie geometries reach at least 700° F. faster than a square geometry even though the current path length between busbars is equivalent for each heater at 1". This type of heater can be made from other materials such as etched foil. It is the geometry that is the key feature to create areas of high watt density.

Figure 17:
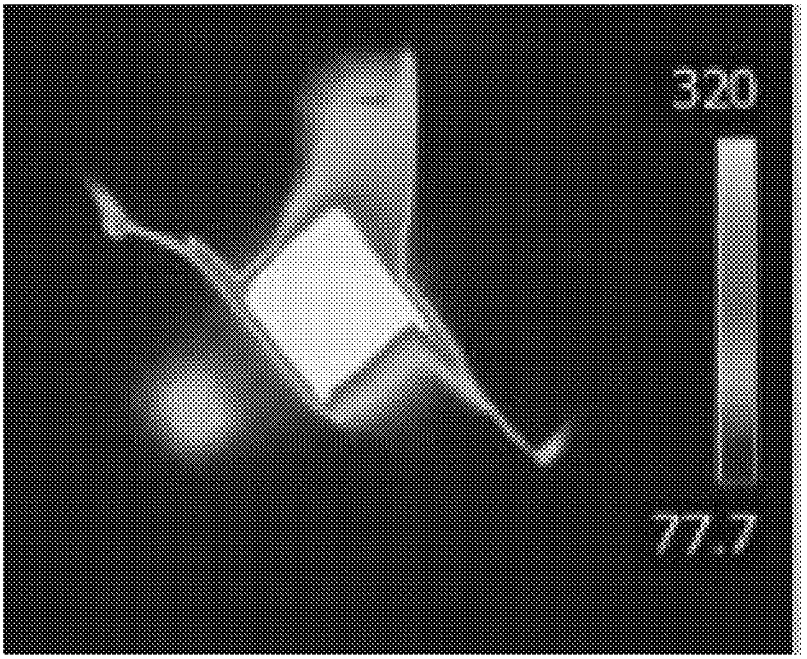
FIG. 17 shows a thermal image of a bow-tie shaped heater.
Figure 18:
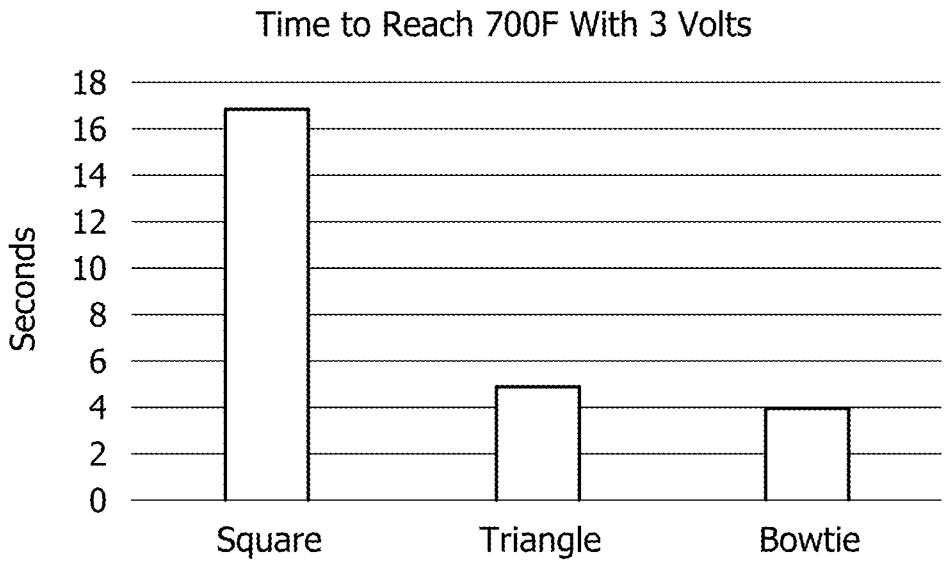
FIG. 18 shows the time needed for three different shapes to reach 700° F. for the same applied current.

The square heater showed uniform heating across the heater. The triangle heater showed a low temp of 68.8° C. (155° F.) on cold side of heater and the hot end was at least 700° F. The bowtie configuration showed low temp of 98.9° C. (209° F.) on the outside and at least 700° F. in center (see FIG. 17). The results of time for each shape to reach 700° F. are shown in FIG. 18

Figure 19:
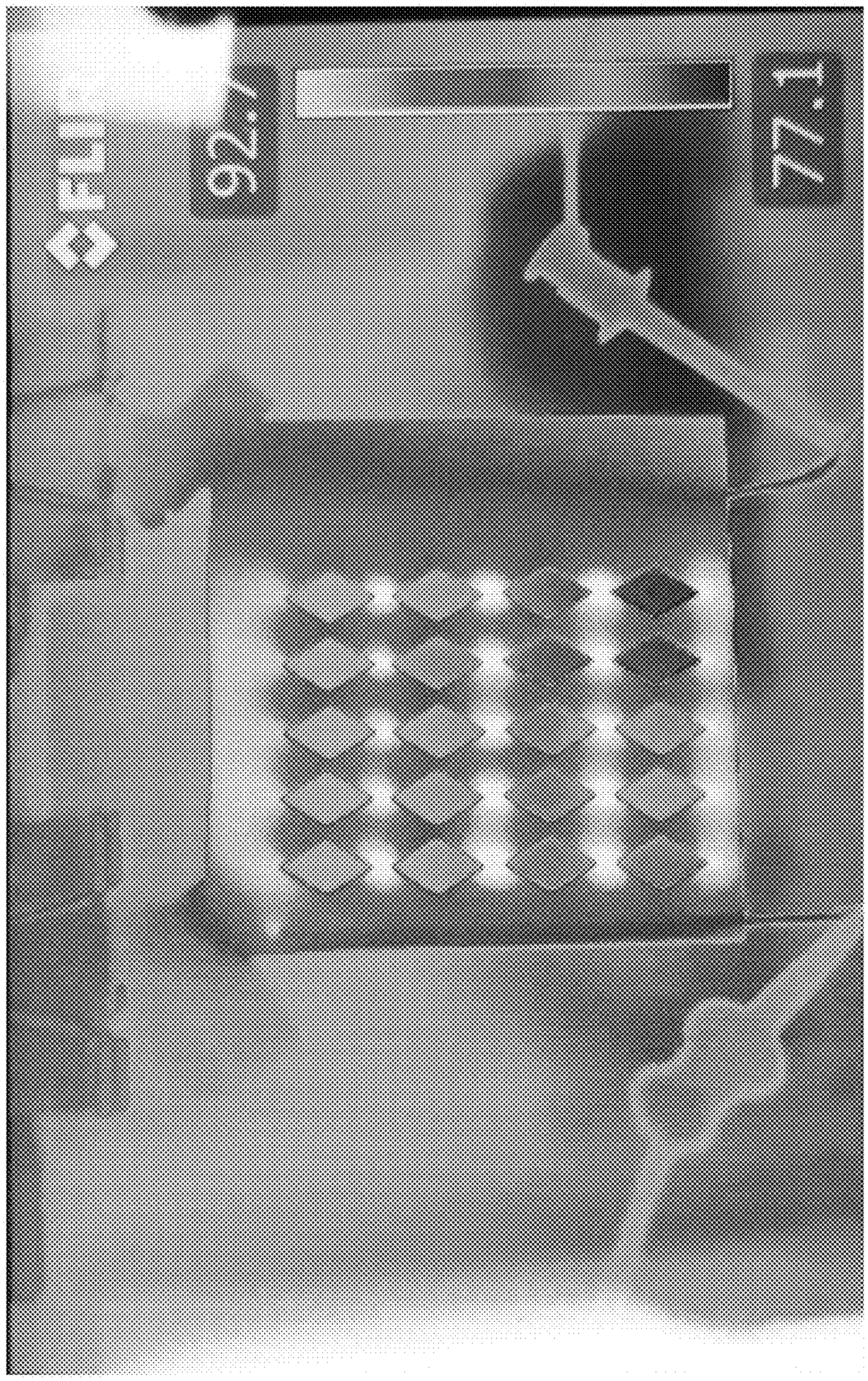
FIG. 19 shows a thermal image of a heater with diamond cutouts that are located to create hot spots at specific points.

Another device that was tested was a CNT resistive heating sheet in which diamond-shaped holes were cut in the material. FIG. 19 is a thermal image of a heater with diamond cutouts that are located to create hot spots at specific points. The thermal gradients can be understood by reference to the temperature scale shown on the right. As can be seen, thermal hotspots are observed at constrictions in the direction of current flow but not at constrictions in other directions (note that relatively cool spots are observed at constrictions orthogonal to current flow.

Calculated Example

The calculated example below illustrates some advantages of the invention.

| | |
|---|---|
| 4000.0 | Power generated, W/in2 |
| 620.0 | W/cm2 |
| 0.250 | Area of 5 mm rectangular spot (cm2) |
| 155.0 | Power needed in 5 mm spot (W) |
| 17.2 | Power = V*I, I needed for 9 V (A) |
| 0.5 | Resistance needed V = IR, V/I (ohms) |
| 0.5 | Sheet Resistance needed for 5 mm square (ohm/sq) |
| 4000.0 | Power generated, W/in2 |
| 620.0 | W/cm2 |
| 0.003 | Area of 0.5 mm rec. spot (cm2) |
| 1.6 | Power needed in 5 mm spot (W) |
| 0.2 | Power = V*I, I needed for 9 V (A) |
| 52.3 | Resistance needed V = IR, V/I (ohms) |
| 52.3 | Sheet Resistance needed for 5 mm square (ohm/sq) |

What is claimed:

1. A spot heater, comprising:

a sheet of resistive heating material that comprises an area or areas of reduced cross-sectional area which are adapted to constrict current flow through the sheet of resistive heating material;

and an actuator for providing electrical current through the sheet; and wherein the area or areas of reduced cross-sectional areas are formed by opposing notches in the resistive heating material wherein each of the opposing notches has a feature angle of between 5 and 60 degrees.

2. The spot heater of claim 1 comprising at least one electrical connection of the sheet to an anode and at least one electrical connection of the sheet to a cathode.

3. The spot heater of claim 1 wherein each of the opposing notches has a feature angle of between 5 and 40 degrees.

4. The spot heater of claim 1 wherein the opposing notches notch creates a gap having a gap height and wherein each notch has incoming and outgoing constriction angles of at least 70 degrees on both sides of the gap.

5. The spot heater of claim 1 wherein the sheet of resistive heating material comprises outer edges that contact busbars and wherein the area or areas of reduced cross sections have cross sectional areas that are at least 50% smaller than areas toward the outer edges.

6. The spot heater of claim 5 wherein temperature in a hot spot during operation is at least 100 K hotter than other areas of the sheet of heating material.

7. The spot heater of claim 1 wherein the sheet of resistive heating material has a plurality of cut-outs or openings and wherein, during operation, hot spots occur at constrictions between the cut-outs or openings in material.

8. The spot heater of claim 7 wherein the cut-outs or openings are voids.

9. The spot heater of claim 7 wherein the cut-outs or openings are filled with an insulating material.

10. The spot heater of claim 1 wherein the sheet material comprises at least 5 hot spots created by areas of constrained current flow during operation.

11. The spot heater of claim 1 wherein the sheet has a surface area of at least 10-$cm^2$ and where each hot spot has an area of between 0.1 to 2 $cm^2$; wherein a single sheet of the resistive heating material comprises at least 10 cut-outs or openings and 10 hot spots.

12. A spot heater, comprising:

a sheet of resistive heating material that comprises an area or areas of reduced cross-sectional area which are adapted to constrict current flow through the sheet of resistive heating material;

and an actuator for providing electrical current through the sheet;

wherein the resistive sheet is a triangle with an anode connected at one edge of the triangle through a busbar and a cathode connected to an opposite point of the triangle.

13. A method of resistive heating, comprising:

providing a sheet of a resistive heating material that comprises an area or areas of reduced cross-sectional area which are adapted to constrict current flow through the sheet of heating material;

passing an electric current through the sheet such that the area or areas adapted to constrict current flow become a hot spot or hot spots that increase in temperature to a temperature that is at least 5 K greater than the average temperature of the sheet; and wherein the area or areas of reduced cross-sectional areas are formed by opposing notches in the resistive heating material wherein each of the opposing notches has a feature angle of between 5 and 60 degrees.

14. The method of claim 13 wherein the opposing notches in the resistive heating material creates the hot spot; wherein the opposing notches create a gap having a gap height and wherein each notch has incoming and outgoing constriction angles of at least 70 degrees on both sides of the gap.

15. The method of claim 13 wherein the temperature in a hot spot is at least 100 K hotter than other areas of the sheet of heating material.

16. The method of claim 13 wherein the hottest contiguous 10% of the sheet is at least 50 K hotter than the 50% of the sheet where the resistive sheet is coldest as measured at the sheet surface.

17. The spot heater of claim 1 wherein the sheet of resistive heating material comprises conductive fibers.

18. The spot heater of claim 17 wherein the fibers are non-aligned.

19. The spot heater of claim 17 wherein the fibers comprise carbon nanotubes.

20. The method of claim 13 wherein the sheet of resistive heating material comprises outer edges that contact busbars and wherein the area or areas of reduced cross sections have cross sectional areas that are at least 40% smaller than areas toward the outer edges.

* * * * *